US012781696B2

(12) United States Patent
Haugsjaahabink et al.

(10) Patent No.: US 12,781,696 B2
(45) Date of Patent: Nov. 3, 2026

(54) FLUID METERING PRESSURE REGULATING SYSTEM

(71) Applicant: Hamilton Sundstrand Corporation, Charlotte, NC (US)

(72) Inventors: Todd Haugsjaahabink, Amherst, MA (US); Juan Du, Simsbury, CT (US); August Coretto, Windsor, CT (US); Michael Ferrarotti, Durham, CT (US); Steve Doerner, Enfield, CT (US); Aaron F. Rickis, Longmeadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/253,564

(22) Filed: Jun. 27, 2025

(65) Prior Publication Data

US 2026/0002503 A1 Jan. 1, 2026

Related U.S. Application Data

(60) Provisional application No. 63/665,714, filed on Jun. 28, 2024.

(51) Int. Cl.
*F02M 37/00* (2006.01)

(52) U.S. Cl.
CPC ............................... *F02M 37/0023* (2013.01)

(58) Field of Classification Search
CPC .. F02C 9/26; F02C 7/22; G05D 16/20; F02M 37/0023; F16K 11/07
See application file for complete search history.

(56) References Cited

U.S. PATENT DOCUMENTS

| | | | | |
|---|---|---|---|---|
| 5,490,379 A * | 2/1996 | Wernberg | F02C 9/46 60/39.281 |
| 5,715,674 A | 2/1998 | Reuter et al. | |
| 6,176,076 B1 * | 1/2001 | Ford | F02C 9/263 60/734 |
| 6,981,359 B2 | 1/2006 | Wernberg et al. | |
| 7,413,141 B1 | 8/2008 | Smith | |
| 8,656,944 B2 | 2/2014 | Benney et al. | |
| 11,204,168 B2 | 12/2021 | Yates et al. | |
| 11,421,600 B1 * | 8/2022 | Reuter | F02C 7/222 |
| 2008/0169143 A1 * | 7/2008 | O'Shea | F02C 7/236 180/69.4 |

(Continued)

*Primary Examiner* — Sizo B Vilakazi
(74) *Attorney, Agent, or Firm* — Kinney & Lange, P.A.

(57) ABSTRACT

A fuel system includes a system inlet and a system outlet. The fuel system also includes a metering valve with a metering valve inlet fluidically connected to the system inlet, and a metering valve outlet fluidically connected to the metering valve inlet. A pressure regulating valve includes an inlet fluidically connected to the metering valve outlet, and an outlet fluidically connected to the system outlet. A spool of the pressure regulating valve is configured to fluidically open and close the inlet to the outlet. The pressure regulating valve also includes a control chamber on a control side of the spool. A pilot valve includes a return port fluidically connected to the system outlet, and a supply port fluidically connected to a line fluidically connecting the metering valve outlet to the inlet of the pressure regulating valve. The pilot valve also includes a signal port fluidically connected to the control chamber.

20 Claims, 2 Drawing Sheets

(56) References Cited

U.S. PATENT DOCUMENTS

| | | | | |
|---|---|---|---|---|
| 2010/0158707 | A1* | 6/2010 | Griffiths | F02C 7/232<br>417/222.1 |
| 2011/0023982 | A1* | 2/2011 | Griffiths | F02C 7/232<br>137/511 |
| 2011/0146823 | A1* | 6/2011 | Griffiths | F02C 9/32<br>137/625.48 |
| 2012/0234014 | A1* | 9/2012 | Reuter | F02C 9/263<br>60/773 |
| 2021/0388773 | A1* | 12/2021 | Zielinski | F02C 7/232 |
| 2023/0107881 | A1* | 4/2023 | Hahn | F02C 7/22<br>137/625.64 |

* cited by examiner

FLUID METERING PRESSURE REGULATING SYSTEM

CROSS-REFERENCE TO RELATED APPLICATION(S)

The present application claims priority to U.S. Provisional Patent Application No. 63/665,714 filed on Jun. 28, 2024, the contents of which are incorporated by reference herein in their entirety.

BACKGROUND

Typical turbine engine fuel metering systems use a pressure regulating valve to regulate a delta pressure across a known metering window. The more consistent the delta pressure is over all operating conditions the more accurate metered flow will be. Because of large variation in flows and pressure, this pressure regulating valve can have large variations in spring load and flow forces that make it difficult for the pressure regulating valve to maintain a consistent delta pressure. To improve accuracy of the pressure regulating valve, a second valve can be used to sense the delta pressure of the metering window and send a signal pressure to the pressure regulating valve to better maintain the delta pressure. This signal pressure typically introduces an internal leak path(s), which makes both metered flow and the pumping system less efficient.

SUMMARY

In one aspect of the disclosure, a fuel metering system includes a system inlet and a system outlet downstream of the system inlet. The fuel metering system also includes a metering valve with a metering valve inlet fluidically connected to the system inlet. A metering valve outlet is fluidically connected to the metering valve inlet. The metering valve also includes a metering valve spool configured to open and close the metering valve inlet to the metering valve outlet. The fuel metering system also includes a pressure regulating valve with an inlet fluidically connected to the metering valve outlet and an outlet fluidically connected to the system outlet. The pressure regulating valve also includes a spool configured to fluidically open and close the inlet to the outlet. The pressure regulating valve also includes a control chamber on an opposite side of the spool from the inlet. The fuel metering system also includes a pilot valve with a housing. The housing includes a return port fluidically connected to the system outlet and a supply port fluidically connected to a line fluidically connecting the metering valve outlet to the inlet of the pressure regulating valve. The housing also includes a signal port fluidically connected to the control chamber, and a setting orifice fluidically connected to the control chamber and the signal port. The pilot valve also includes a pilot valve spool with a high pressure window fluidically connecting the supply port to the setting orifice, and a low pressure window fluidically connecting the return port to the signal port.

In another example of the disclosure, a fuel system includes a system inlet and a system outlet downstream of the system inlet. The fuel system also includes a metering valve with a metering valve inlet fluidically connected to the system inlet, a metering valve outlet fluidically connected to the metering valve inlet, and a metering valve spool configured to open and close the metering valve inlet to the metering valve outlet. The fuel system also includes a pressure regulating valve with an inlet fluidically connected to the metering valve outlet and an outlet fluidically connected to the system outlet. The pressure regulating valve also includes a spool configured to fluidically open and close the inlet to the outlet, and a control chamber on a control side of the spool. The fuel system also includes a pilot valve. The pilot valve includes a return port fluidically connected to the system outlet and a supply port fluidically connected to a line fluidically connecting the metering valve outlet to the inlet of the pressure regulating valve. The pilot valve also includes a signal port fluidically connected to the control chamber.

The fuel system of the preceding paragraph can optionally include, additionally and/or alternatively, any one or more of the following features, configurations and/or additional components in the paragraphs below.

In another example of the disclosure, a fuel system includes a system inlet, a system outlet downstream of the system inlet, and a metering valve. The metering valve includes a metering valve inlet fluidically connected to the system inlet, and a metering valve outlet fluidically connected to the metering valve inlet. The fuel system also includes a pressure regulating valve. The pressure regulating valve includes an inlet fluidically connected to the metering valve outlet, and an outlet fluidically connected to the system outlet. The pressure regulating valve also includes a spool configured to fluidically open and close the inlet to the outlet, and a control chamber on a control side of the spool. The fuel system also includes a pilot valve. The pilot valve includes a return port fluidically connected to the system outlet, and a supply port fluidically connected to a line fluidically connecting the metering valve outlet to the inlet of the pressure regulating valve. The pilot valve also includes a signal port fluidically connected to the control chamber.

DETAILED DESCRIPTION

The following disclosure includes a system with a metering valve, a pressure regulating valve, and a pilot valve. The pilot valve of the system controls the pressure regulating valve using pressure signals taken downstream of an outlet of the metering valve. Since the pilot valve uses pressure signals taken downstream of the metering valve, any fuel leakage in the pilot valve does not impact accuracy of the fuel output of the system because the fuel leaking in the pilot valve passed through the metering valve before reaching the pilot valve. The system is discussed below with reference to FIGS. 1 and 2.

Figure 1:
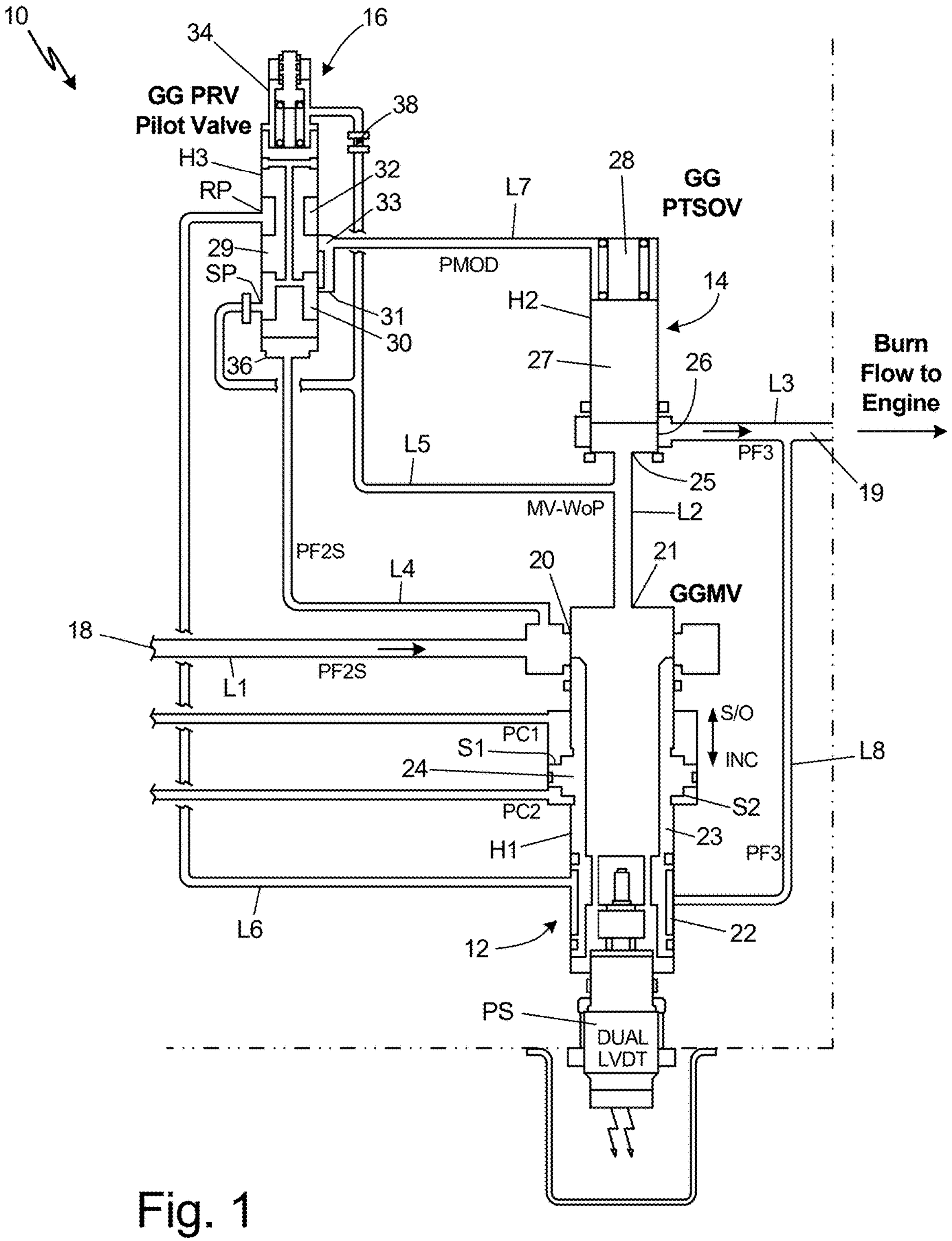
FIG. 1 is a schematic representation of a fluid metering pressure regulation system with a metering valve in an open position and a pressure regulating valve in an open position.

FIG. 1 is a schematic diagram of one example of fluid metering pressure regulation system 10. As shown in the example of FIG. 1, fluid metering pressure regulation system 10 (herein after referred to as system 10) includes metering valve 12, pressure regulating valve 14, pilot valve 16, system inlet 18, system outlet 19, lines L1-L8, first control line PC1, and second control line PC2. Metering valve 12 includes housing H1, inlet 20, outlet 21, window 22, spool 23, control chamber CC, and position sensor PS. Spool 23 of metering valve 12 includes land 24 with first control surface S1 and second control surface S2. Pressure regulating valve 14 includes housing H2, inlet 25, outlet 26, spool 27, and control chamber 28. Pilot valve 16 includes housing H3, spool 29, high pressure window 30, setting orifice 31, low pressure window 32, signal port 33, supply port SP, return port RP, first control chamber 34, and second control chamber 36. System 10 can also include fixed orifice 38 for damping line L5.

Metering valve 12 is a position-controlled metering valve. Inlet 20 and outlet 21 are formed in housing H1 and are fluidically connected together when inlet 20 is not closed by spool 23. Spool 23 is inside housing H1. Land 24 is formed on spool 23 between a first end and a second end of spool 23. First control surface S1 is formed on a first side of land 24 and second control surface S2 is formed on a second side of control land 24. First control line PC1 is fluidically connected to first control surface S1 through a first control port in housing H1, and second control line PC2 is fluidically connected to second control surface S2 through a second control port in housing H1. In the example of FIG. 1, metering valve 12 is hydraulically controlled by an electrohydraulic servo valve (not shown) that is fluidically connected to first control line PC1 and second control line PC2. In other examples, metering valve 12 can be a mechanical valve or a servo actuated valve. Window 22 of metering valve 12 is formed on spool 23 of metering valve 12. Metering valve 12 includes a second inlet and a second outlet for window 22 distinct from inlet 20 and outlet 21. Window 22 fluidically connects line L6 to line L8.

Position sensor PS can be a linear variable pressure transducer (also referred to as a linear variable displacement transistor) that is connected to spool 23 and housing H1 to sense a position of spool 23 within housing H1. Position sensor PS can be in communication with an electronic controller (not shown) to communicate the sensed position of spool 23 to the electronic controller.

Inlet 20 of metering valve 12 is fluidically connected to system inlet 18 by line L1. System inlet 18 is fluidically connected to a pump, such as a centrifugal pump, and supplies fuel to inlet 20 of metering valve 12 at a first pressure PF2S. In the example of FIG. 1, spool 23 of metering valve 12 is in an open position to allow fuel to enter through inlet 20 of metering valve 12 and pass through outlet 21 of metering valve 12. Line L2 fluidically connects outlet 21 of metering valve 12 to inlet 25 of pressure regulating valve 14.

Inlet 25 and outlet 26 of pressure regulating valve 14 are formed in housing H2 of pressure regulating valve 14. Inlet 25 of pressure regulating valve 14 is fluidically connected to outlet 26 of pressure regulating valve 14. Spool 27 is disposed within housing H2 of pressure regulating valve 14. Control chamber 28 of pressure regulating valve 14 can be on a control side of spool 27. In the example of FIG. 1, the control side of spool 27 is an opposite side of spool 27 from inlet 25. A spring can be inside control chamber 28 to bias spool 27 toward a closed position that blocks flow from inlet 25 to outlet 26 of pressure regulating valve 14. Pressure regulating valve 14 can also include at least one seal, such as a face seal, that abuts spool 27 when in the closed position to prevent fuel from leaking past spool 27 to outlet 26.

Spool 27 is actuated within pressure regulating valve 14 to modulate fuel flow through outlet 26. This modulation of fuel flow through outlet 26 by spool 27 of pressure regulating valve 14 generates a metering valve window outlet pressure (MV-WOP), which is the pressure of the fuel between inlet 20 of metering valve 12 and outlet 26 of pressure regulating valve 14. The fuel leaves outlet 26 of pressure regulating valve 14 at a third pressure PF3. The metering valve window outlet pressure MV-WOP is lower than the first pressure PF2S, but is higher than the third pressure PF3. Outlet 26 of pressure regulating valve 14 is fluidically connected to system outlet 19 by third line L3. System outlet 19 can be fluidically connected to at least one burner nozzle of a combustion assembly. As discussed below, pilot valve 16 controls a modulated pressure PMOD in control chamber 28 to control the position of spool 27 of pressure regulating valve 14.

Setting orifice 31, signal port 33, supply port SP, and return port RP are formed in housing H3 of pilot valve 16. Spool 29 is disposed inside of housing H3. High pressure window 30 is formed on spool 29 of pilot valve 16, and low pressure window 32 is also formed on spool 29 of pilot valve 16. As shown in the example of FIG. 1, first control chamber 34 is on one control side of spool 29 of pilot valve 16, and second control chamber 36 is on a second control side of spool 29 of pilot valve 16. A spring is disposed in first control chamber 34 and is compressed between housing H3 and spool 29 to bias spool 29 to a position that fluidically connects low pressure window 32 to signal port 33. Line L5 (along with line L2) fluidically connects first control chamber 34 to outlet 21 of metering valve 12 and/or to inlet 25 of pressure regulating valve 14, such that first control chamber 34 receives a first control pressure signal at the metering valve window outlet pressure MV-WOP. Line L4 fluidically connects second control chamber 36 to inlet 20 of metering valve 12 and/or to line L1, such that second control chamber 36 receives a second control pressure signal at the first pressure PF2S. High pressure window 30 is fluidically connected to line L5, such that high pressure window 30 receives fuel at the metering valve window outlet pressure MV-WOP. High pressure window 30 is fluidically connected to setting orifice 31 formed in a housing of pilot valve 16. High pressure window 30 can be elongated in shape such that high pressure window 30 is always fluidically connected to setting orifice 31 regardless of the position of spool 29 of pilot valve 16. Setting orifice 31 is fluidically connected to control chamber 28 of pressure regulating valve 14.

Return port RP fluidically connects low pressure window 32 to line L6. As shown in the example of FIG. 1, line L6 fluidically connects low pressure window 32 to window 22 of metering valve 12. Window 22 of metering valve 12 is formed on spool 23 of metering valve 12. Metering valve 12 includes a second inlet and a second outlet for window 22 distinct from inlet 20 and outlet 21. Window 22 fluidically connects line L6 to line L8. Line L8 fluidically connects window 22 of metering valve 12 to line L3. When window 22 is open, such as shown in the example of FIG. 1, fuel at the third pressure PF3 is supplied to low pressure window 32 of pilot valve 16 via line 8, window 22, and line L6. Depending on the position of spool 29 within pilot valve 16, low pressure window 32 can fluidically connect signal port 33 to line L6 and modulate the flow of fuel through signal port 33. Signal port 33 and setting orifice 31 are both fluidically connected to line L7.

Line L7 fluidically connects signal port 33 and setting orifice 31 to control chamber 28 of pressure regulating valve 14. While inlet 20 of metering valve 12 is open and fluidically connected to outlet 21, pilot valve 16 uses fuel at the metering valve window outlet pressure MV-WOP as a high-pressure signal source and uses the third pressure PF3 as a low-pressure return to bleed pressure to system outlet 19 to generate modulated pressure PMOD in line L7 and control chamber 28. Modulated pressure PMOD in control chamber 28, in addition to the spring in control chamber 28, controls the position of spool 27 of pressure regulating valve 14. Any leakage of fuel in pilot valve 16 around spool 29 will be directed to system outlet 19 via line L6, window 22, and line L8.

Leakage of fuel from a source upstream of inlet 20 of metering valve 12 into system 10 downstream of outlet 21 of metering valve 12 would impact the accuracy and efficiency of system 10. Because pilot valve 16 takes signal pressure from flow that has already gone past outlet 21 of metering valve 12 and sends signal pressure back downstream of outlet 21 of metering valve 12, any leakage in pilot valve 16 does not introduce fuel to system outlet 19 from a location upstream of inlet 20 of metering valve 12. Thus, leakage in system 10 of the example of FIG. 1 has a reduced impact on accuracy compared to previous systems and reduces leakage from a supply pressure, which improves the efficiency of a pumping system (not shown) supplying system inlet 18.

Figure 2:
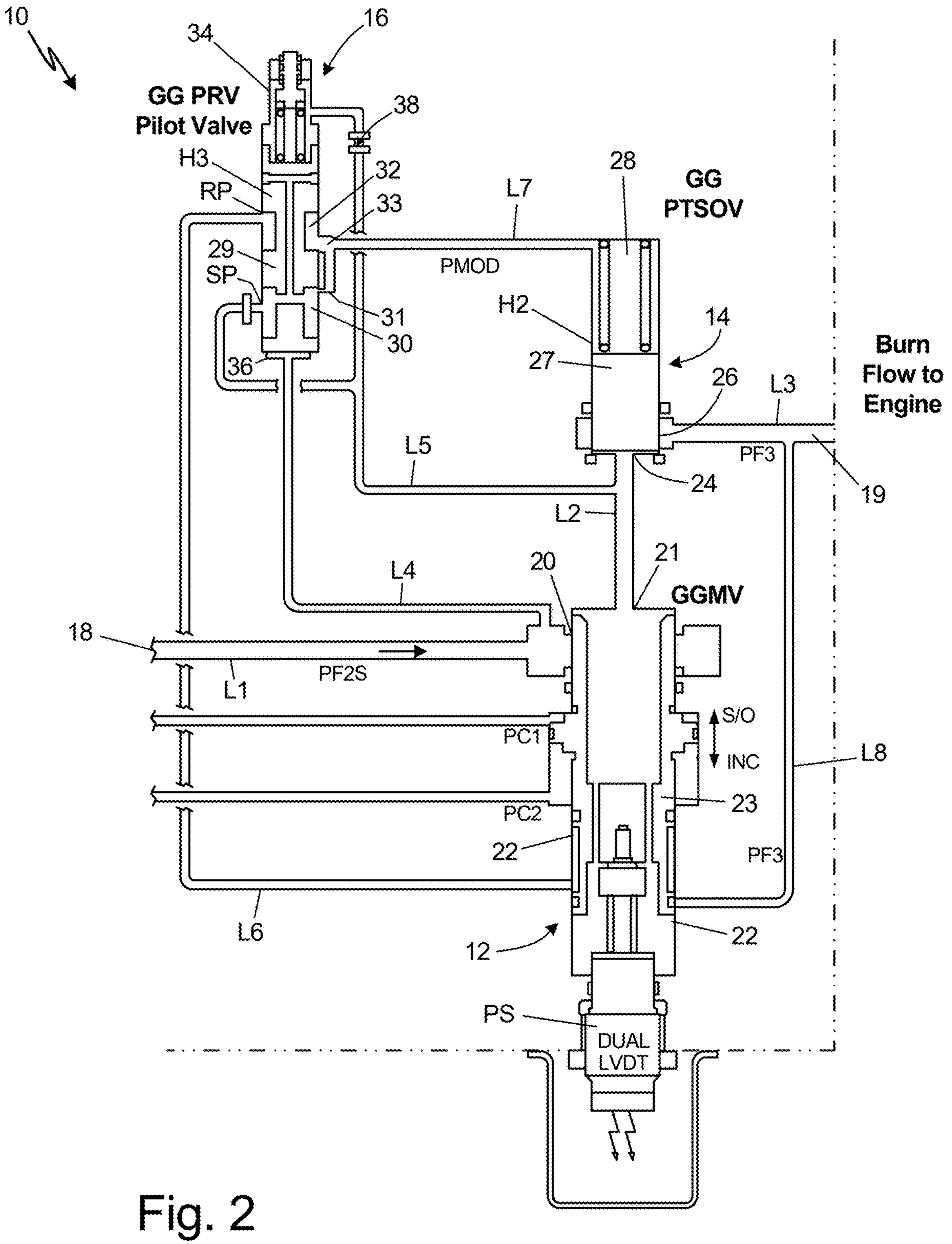
FIG. 2 is another schematic representation of the fluid metering pressure regulation system from FIG. 1 with the metering valve in a closed position and the pressure regulating valve in a closed position.

FIG. 2 shows a schematic diagram of the example of system 10 from FIG. 1 in a closed state. System 10 is put into the closed state when the electrohydraulic servo valve (not shown) connected to first control line PC1 and second control line PC2 receives a signal that commands the electrohydraulic servo valve to connect first control line PC1 to a low pressure source and to connect second control line PC2 to a high pressure source. When first control line PC1 is connected to a low pressure source and second control line PC2 is connected to a high pressure source, the higher pressure from second control line PC2 acts on second control surface S2 of control land 24 and moves spool 23 of metering valve 12 to close inlet 20 from outlet 21 of metering valve 12. While in the closed state, spool 23 blocks inlet 20 from outlet 21 of metering valve 12, and blocks and seals line L8 from line L6.

With metering valve 12 closed, pressure from line L4 can bleed into L2 through an orifice (not shown), filling line L2, line L5, line L6, and line L7 with the same pressure as line L1 and L4. The fluid pressure on both sides of spool 27 of pressure regulating valve 14 equalizes and the spring in control chamber 28 moves spool 27 against the face seal to block and seal outlet 26 from inlet 25. While in the closed state, any leakage of fuel at first pressure PF2S in system 10 is blocked from system outlet 19 by the spools and seals of metering valve 12 and pressure regulating valve 14.

Discussion of Possible Embodiments

The following are non-exclusive descriptions of possible examples of the present invention.

In one aspect of the disclosure, a fuel metering system includes a system inlet and a system outlet downstream of the system inlet. The fuel metering system also includes a metering valve with a metering valve inlet fluidically connected to the system inlet. A metering valve outlet is fluidically connected to the metering valve inlet. The metering valve also includes a metering valve spool configured to open and close the metering valve inlet to the metering valve outlet. The fuel metering system also includes a pressure regulating valve with an inlet fluidically connected to the metering valve outlet and an outlet fluidically connected to the system outlet. The pressure regulating valve also includes a spool configured to fluidically open and close the inlet to the outlet. The pressure regulating valve also includes a control chamber on an opposite side of the spool from the inlet. The fuel metering system also includes a pilot valve with a housing. The housing includes a return port fluidically connected to the system outlet and a supply port fluidically connected to a line fluidically connecting the metering valve outlet to the inlet of the pressure regulating valve. The housing also includes a signal port fluidically connected to the control chamber, and a setting orifice fluidically connected to the control chamber and the signal port. The pilot valve also includes a pilot valve spool with a high pressure window fluidically connecting the supply port to the setting orifice, and a low pressure window fluidically connecting the return port to the signal port.

The fuel metering system of the preceding paragraph can optionally include, additionally and/or alternatively, any one or more of the following features, configurations and/or additional components in the paragraphs below.

In an embodiment of the foregoing fuel metering system, the pilot valve further comprises: a first control chamber on a first control side of the pilot valve spool, wherein the first control chamber is fluidically connected to the line fluidically connecting the metering valve outlet to the inlet of the pressure regulating valve; and a second control chamber on a second control side of the pilot valve spool, wherein the second control chamber is fluidically connected to the metering valve inlet.

In an embodiment of the foregoing fuel metering system, the fuel metering system further comprises a spring disposed in the first control chamber and compressed between the housing of the pilot valve and the pilot valve spool to bias the pilot valve spool to a position that fluidically connects the low pressure window to signal port.

In an embodiment of the foregoing fuel metering system, the metering valve further comprises: a first control port fluidically connected to a first control line; a second control port fluidically connected to a second control line; a land formed on the metering valve spool, wherein the land comprises: a first control surface fluidically connected to the first control port; and a second control surface fluidically connected to the second control port.

In an embodiment of the foregoing fuel metering system, the metering valve further comprises: a second inlet fluidically connected to the return port of the pilot valve; a second outlet fluidically connected to the system outlet; and a window formed in the metering valve spool and fluidically connecting the second inlet to the second outlet when the metering valve inlet is open to the metering valve outlet.

In an embodiment of the foregoing fuel metering system, the metering valve spool fluidically disconnects the second outlet from the second inlet when the metering valve inlet is closed to the metering valve outlet.

In an embodiment of the foregoing fuel metering system, the pressure regulating valve further comprises a second spring in the control chamber biasing the spool toward the inlet of the pressure regulating valve.

In an embodiment of the foregoing fuel metering system, the fuel metering system further comprises a position sensor configured to sense a position of the metering valve spool within the metering valve.

In another example of the disclosure, a fuel system includes a system inlet and a system outlet downstream of the system inlet. The fuel system also includes a metering valve with a metering valve inlet fluidically connected to the system inlet, a metering valve outlet fluidically connected to the metering valve inlet, and a metering valve spool configured to open and close the metering valve inlet to the metering valve outlet. The fuel system also includes a pressure regulating valve with an inlet fluidically connected to the metering valve outlet and an outlet fluidically connected to the system outlet. The pressure regulating valve also includes a spool configured to fluidically open and close the inlet to the outlet, and a control chamber on a control side of the spool. The fuel system also includes a pilot valve. The pilot valve includes a return port fluidically connected to the system outlet and a supply port fluidically connected to a line fluidically connecting the metering valve outlet to the inlet of the pressure regulating valve. The pilot valve also includes a signal port fluidically connected to the control chamber.

The fuel system of the preceding paragraph can optionally include, additionally and/or alternatively, any one or more of the following features, configurations and/or additional components in the paragraphs below.

In an embodiment of the foregoing fuel system, the pilot valve further comprises: a setting orifice fluidically connected to the control chamber and the signal port; and a pilot valve spool comprising: a high pressure window fluidically connecting the supply port to the setting orifice; and a low pressure window fluidically connecting the return port to the signal port.

In an embodiment of the foregoing fuel system, the pilot valve further comprises: a first control chamber on a first control side of the pilot valve spool, wherein the first control chamber is fluidically connected to the line fluidically connecting the metering valve outlet to the inlet of the pressure regulating valve; and a second control chamber on a second control side of the pilot valve spool, wherein the second control chamber is fluidically connected to the system inlet.

In an embodiment of the foregoing fuel system, the fuel system further comprises a spring disposed in the first control chamber and compressed in the first control chamber to bias the pilot valve spool to a position that fluidically connects the low pressure window to the signal port.

In an embodiment of the foregoing fuel system, the metering valve further comprises: a first control port fluidically connected to a first control line; a second control port fluidically connected to a second control line; a land formed on the metering valve spool, wherein the land comprises: a first control surface fluidically connected to the first control port; and a second control surface fluidically connected to the second control port.

In an embodiment of the foregoing fuel system, the metering valve further comprises: a second inlet fluidically connected to the return port of the pilot valve; a second outlet fluidically connected to the system outlet; and a window formed in the metering valve spool and fluidically connecting the second inlet to the second outlet when the metering valve inlet is open to the metering valve outlet.

In an embodiment of the foregoing fuel system, the metering valve spool fluidically disconnects the second outlet from the second inlet when the metering valve inlet is closed to the metering valve outlet.

In an embodiment of the foregoing fuel system, the pressure regulating valve further comprises a second spring in the control chamber biasing the spool toward the inlet of the pressure regulating valve.

In an embodiment of the foregoing fuel system, the fuel system further comprises a position sensor configured to sense a position of the metering valve spool within the metering valve.

In another example of the disclosure, a fuel system includes a system inlet, a system outlet downstream of the system inlet, and a metering valve. The metering valve includes a metering valve inlet fluidically connected to the system inlet, and a metering valve outlet fluidically connected to the metering valve inlet. The fuel system also includes a pressure regulating valve. The pressure regulating valve includes an inlet fluidically connected to the metering valve outlet, and an outlet fluidically connected to the system outlet. The pressure regulating valve also includes a spool configured to fluidically open and close the inlet to the outlet, and a control chamber on a control side of the spool. The fuel system also includes a pilot valve. The pilot valve includes a return port fluidically connected to the system outlet, and a supply port fluidically connected to a line fluidically connecting the metering valve outlet to the inlet of the pressure regulating valve. The pilot valve also includes a signal port fluidically connected to the control chamber.

The fuel system of the preceding paragraph can optionally include, additionally and/or alternatively, any one or more of the following features, configurations and/or additional components in the paragraphs below.

In an embodiment of the foregoing fuel system, the pilot valve further comprises: a setting orifice fluidically connected to the control chamber and the signal port; and a pilot valve spool comprising: a high pressure window fluidically connecting the supply port to the setting orifice; and a low pressure window fluidically connecting the return port to the signal port.

In an embodiment of the foregoing fuel system, the pilot valve further comprises: a first control chamber on a first control side of the pilot valve spool, wherein the first control chamber is fluidically connected to the line fluidically connecting the metering valve outlet to the inlet of the pressure regulating valve; a second control chamber on a second control side of the pilot valve spool, wherein the second control chamber is fluidically connected to the system inlet; and a spring disposed in the first control chamber and compressed in the first control chamber to bias the pilot valve spool to a position that fluidically connects the low pressure window to the signal port.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel metering system comprising:

a system inlet;

a system outlet downstream of the system inlet;

a metering valve comprising:

a metering valve inlet fluidically connected to the system inlet;

a metering valve outlet fluidically connected to the metering valve inlet; and a metering valve spool configured to open and close the metering valve inlet to the metering valve outlet;

a pressure regulating valve comprising:

an inlet fluidically connected to the metering valve outlet;

an outlet fluidically connected to the system outlet;

a spool configured to fluidically open and close the inlet to the outlet; and a control chamber on an opposite side of the spool from the inlet;

a pilot valve comprising:

a housing comprising;

a return port fluidically connected to the system outlet;

a supply port fluidically connected to a line fluidically connecting the metering valve outlet to the inlet of the pressure regulating valve;

a signal port fluidically connected to the control chamber; and a setting orifice fluidically connected to the control chamber and the signal port; and a pilot valve spool comprising:

a high pressure window fluidically connecting the supply port to the setting orifice; and a low pressure window fluidically connecting the return port to the signal port.

2. The fuel metering system of claim 1, wherein the pilot valve further comprises:

a first control chamber on a first control side of the pilot valve spool, wherein the first control chamber is fluidically connected to the line fluidically connecting the metering valve outlet to the inlet of the pressure regulating valve; and a second control chamber on a second control side of the pilot valve spool, wherein the second control chamber is fluidically connected to the metering valve inlet.

3. The fuel metering system of claim 2, further comprising:

a spring disposed in the first control chamber and compressed between the housing of the pilot valve and the pilot valve spool to bias the pilot valve spool to a position that fluidically connects the low pressure window to signal port.

4. The fuel metering system of claim 3, wherein the metering valve further comprises:

a first control port fluidically connected to a first control line;

a second control port fluidically connected to a second control line;

a land formed on the metering valve spool, wherein the land comprises:

a first control surface fluidically connected to the first control port; and a second control surface fluidically connected to the second control port.

5. The fuel metering system of claim 4, wherein the metering valve further comprises:

a second inlet fluidically connected to the return port of the pilot valve;

a second outlet fluidically connected to the system outlet; and a window formed in the metering valve spool and fluidically connecting the second inlet to the second outlet when the metering valve inlet is open to the metering valve outlet.

6. The fuel metering system of claim 5, wherein the metering valve spool fluidically disconnects the second outlet from the second inlet when the metering valve inlet is closed to the metering valve outlet.

7. The fuel metering system of claim 6, wherein the pressure regulating valve further comprises:

a second spring in the control chamber biasing the spool toward the inlet of the pressure regulating valve.

8. The fuel metering system of claim 6, further comprising:

a position sensor configured to sense a position of the metering valve spool within the metering valve.

9. A fuel system comprising:

a system inlet;

a system outlet downstream of the system inlet;

a metering valve comprising:

a metering valve inlet fluidically connected to the system inlet;

a metering valve outlet fluidically connected to the metering valve inlet; and a metering valve spool configured to open and close the metering valve inlet to the metering valve outlet;

a pressure regulating valve comprising:

an inlet fluidically connected to the metering valve outlet;

an outlet fluidically connected to the system outlet;

a spool configured to fluidically open and close the inlet to the outlet; and a control chamber on a control side of the spool;

a pilot valve comprising:

a return port fluidically connected to the system outlet;

a supply port fluidically connected to a line fluidically connecting the metering valve outlet to the inlet of the pressure regulating valve; and a signal port fluidically connected to the control chamber.

10. The fuel system of claim 9, wherein the pilot valve further comprises:

a setting orifice fluidically connected to the control chamber and the signal port; and a pilot valve spool comprising:

a high pressure window fluidically connecting the supply port to the setting orifice; and a low pressure window fluidically connecting the return port to the signal port.

11. The fuel system of claim 10, wherein the pilot valve further comprises:

a first control chamber on a first control side of the pilot valve spool, wherein the first control chamber is fluidically connected to the line fluidically connecting the metering valve outlet to the inlet of the pressure regulating valve; and a second control chamber on a second control side of the pilot valve spool, wherein the second control chamber is fluidically connected to the system inlet.

12. The fuel system of claim 11, further comprising:

a spring disposed in the first control chamber and compressed in the first control chamber to bias the pilot valve spool to a position that fluidically connects the low pressure window to the signal port.

13. The fuel system of claim 9, wherein the metering valve further comprises:

a first control port fluidically connected to a first control line;

a second control port fluidically connected to a second control line;

a land formed on the metering valve spool, wherein the land comprises:

a first control surface fluidically connected to the first control port; and a second control surface fluidically connected to the second control port.

14. The fuel system of claim 9, wherein the metering valve further comprises:

a second inlet fluidically connected to the return port of the pilot valve;

a second outlet fluidically connected to the system outlet; and a window formed in the metering valve spool and fluidically connecting the second inlet to the second outlet when the metering valve inlet is open to the metering valve outlet.

15. The fuel system of claim 14, wherein the metering valve spool fluidically disconnects the second outlet from the second inlet when the metering valve inlet is closed to the metering valve outlet.

16. The fuel system of claim 9, wherein the pressure regulating valve further comprises:

a second spring in the control chamber biasing the spool toward the inlet of the pressure regulating valve.

17. The fuel system of claim 9, further comprising:

a position sensor configured to sense a position of the metering valve spool within the metering valve.

18. A fuel system comprising:

a system inlet;

a system outlet downstream of the system inlet;

a metering valve comprising:

a metering valve inlet fluidically connected to the system inlet; and a metering valve outlet fluidically connected to the metering valve inlet;

a pressure regulating valve comprising:

an inlet fluidically connected to the metering valve outlet;

an outlet fluidically connected to the system outlet;

a spool configured to fluidically open and close the inlet to the outlet; and a control chamber on a control side of the spool;

a pilot valve comprising:

a return port fluidically connected to the system outlet;

a supply port fluidically connected to a line fluidically connecting the metering valve outlet to the inlet of the pressure regulating valve; and a signal port fluidically connected to the control chamber.

19. The fuel system of claim 18, wherein the pilot valve further comprises:

a setting orifice fluidically connected to the control chamber and the signal port; and a pilot valve spool comprising:

a high pressure window fluidically connecting the supply port to the setting orifice; and a low pressure window fluidically connecting the return port to the signal port.

20. The fuel system of claim 19, wherein the pilot valve further comprises:

a first control chamber on a first control side of the pilot valve spool, wherein the first control chamber is fluidically connected to the line fluidically connecting the metering valve outlet to the inlet of the pressure regulating valve;

a second control chamber on a second control side of the pilot valve spool, wherein the second control chamber is fluidically connected to the system inlet; and a spring disposed in the first control chamber and compressed in the first control chamber to bias the pilot valve spool to a position that fluidically connects the low pressure window to the signal port.

* * * * *